Patented July 1, 1941

2,247,880

UNITED STATES PATENT OFFICE 2,247,880

IODINE ORGANIC COMPOUNDS FOR USE AS X-RAY CONTRAST COMPOSITIONS

André Gaston Jules Guerbet, Paris, France

No Drawing. Application January 21, 1938, Serial No. 186,114. In France January 29, 1937

4 Claims. (Cl. 167—95)

Various water soluble iodine organic compounds are used as X-ray contrast compositions. However, their number is still very limited, owing to the numerous conditions to which they must conform and which are often contradictory; thus they should possess a large percentage of iodine, upon which their opacity depends, a great stability, and a great solubility in water; on the other hand they should be deprived of general toxic properties, even at a very large dose, and of local irritating action; furthermore, they should exhibit selective elimination by the reins (in the case of intravenous urography).

The compounds of this class, which have been hitherto proposed, contain two atoms of iodine per molecule, at the maximum.

Applicant has discovered that certain compounds containing four atoms of iodine per molecule and consisting of salts of the tetraiodometa- and tetraiodoparaphthalic acids possess valuable properties of X-ray contrast agents and meet the aforesaid requirements.

While the salts of the tetraiodo-orthophthalic acid have an insufficient solubility and are toxic, the salts of the tetraiodometa- and tetraiodoparaphthalic acids are very soluble, and deprived of any toxic character.

The present invention comprises, as new chemical compounds, the tetraiodometa and tetraiodoparaphthalic acids $C_6I_4(CO_2H)_2$ and their derivatives, as well as the X-ray contrast compositions containing said acids or their derivatives.

The tetraiodometaphthalic acid, whose developed formula is as follows

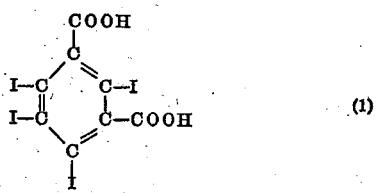

will be obtained in the following manner:

10 g. of metaphthalic acid $C_6H_4(CO_2H)_2$ are dissolved on the oil-bath at 100° C. in a mixture consisting of 60 g. of oleum containing 60% of sulphuric anhydride, and of 20 g. of ordinary sulphuric acid at 66° Baumé.

The temperature is maintained for about 1 hour at 100° C., then 40 g. of iodine is added by fractions, and the mixture is heated gradually to 160° C., this temperature being maintained for about 8 hours.

The following reaction takes place:

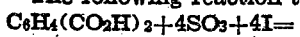

$$C_6H_4(CO_2H)_2 + 4SO_3 + 4I =$$
$$C_6I_4(CO_2H)_2 + 2SO_4H_2 + 2SO_2 \quad (2)$$

The disengagement of sulphur dioxide resulting from this reaction produces an abundant foam.

After cooling, the mixture thus obtained is poured into cold water. If necessary, a sufficient amount of sulphur dioxide is added to remove the excess of free iodine. The insoluble compound which precipitates consists of crude tetraiodo metaphthalic acid. This latter contains, as impurities, hexa-iodo benzene and phthalic acids which are less iodized.

The crude product is treated with a dilute solution of soda lye, in which the hexa-iodo benzene remains insoluble. The alkaline solution, treated with an excess of sulphuric acid, yields a precipitate containing the desired acid, and less iodized acids.

In order to remove the less iodized acids, advantage is taken of the property which they possess, on the contrary to the tetraiodized acid, of producing esters when boiled for several hours with methyl alcohol containing 3% of hydrochloric acid.

The esters thus formed are separated by heating the product in the dry state. The tetraiodometaphthalic acid remains as a residue. It is purified by crystallization from dilute acetic acid.

With regard to the tetraiodoparaphthalic acid, the developed formula of which is as follows:

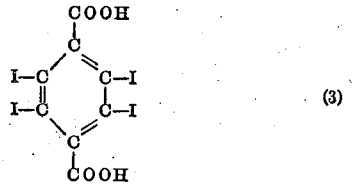

it is prepared as follows:

10 g. of paraphthalic acid are dissolved, on the oil-bath at about 100° C. in 80 g. oleum containing 60% of sulphuric anhydride.

This temperature is maintained for 1 hour, after which 40 g. of powdered iodine are added by fractions.

The temperature is raised to about 175° C. and is maintained for about 5 hours.

At the end of this time, the product of the reaction, which takes place according to the above-mentioned Formula 2, is poured into an excess of cold water.

The crude tetraiodoparaphthalic acid precipitates.

It is treated with an alkaline solution of potash or soda which dissolves the greater part, leaving as insoluble a small quantity of hexa-iodo benzene.

The solution of potassium or sodium tetraiodoparaphthalate thus obtained, when concentrated by evaporation, will deposit crystals on cooling, which are purified by fractional crystallization.

The resulting tetraiodo-acids may be converted into salts of alkali metals, alkali-earth metals, such as sodium or calcium, or of organic bases such as amines, for instance diethylamine, mono, di or tri ethanolamine or ethylenediamine, thus yielding the following salts, which possess a considerable solubility in water:

Sodium tetraiodometa- or paraphthalate

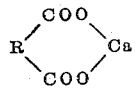

Calcium tetraiodometa- or paraphthalate

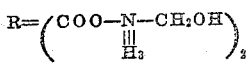

Monoethanolamine tetraiodometa- or paraphthalate

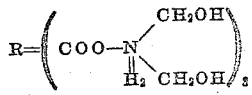

Diethanolamine tetraiodometa- or paraphthalate

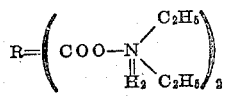

Diethylamine tetraiodometa- or paraphthalate

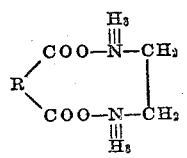

Ethylenediamine tetraiodometa- or paraphthalate in which R corresponds to the radical

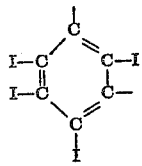

Tetraiodometa or

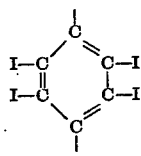

Tetraiodopara

The various compounds constitute excellent X-ray contrast agents for radiology, whether employed separately, mixed together, or mixed with other ingredients.

These compounds, when dissolved in water, can be introduced directly into the natural or pathological cavities of the organism, such as the blood-vessels, the urethra and bladder, the reins and ureters, the digestive system and annexed parts, the male and female genital organs, the biliary vesicle and the hepatic canals, the lymphatic vessels, the space below the arachnoid, fistulas, etc. Further, in the case of the urinary system, they may be administered by intravenous injections, and may be secreted by the reins with the urine, which they render opaque to the X-rays.

A few examples of the use of these products as X-ray contrast agents are given below.

*Example 1*

6 g. of sodium tetraiodometaphthalate dissolved in 12 c. c. of distilled water, were injected into the marginal vein of the ear of a rabbit weighing 1.96 kgs.

A radiograph taken 15 minutes after, showed the image of the urinary system.

The animal survived, in spite of the injection of a dose of 3.06 g. per kg.

*Example 2*

A solution of 6 g. of sodium tetraiodometaphthalate in 10 c. c. of solution injected into human beings by the intravenous method, affords a radiograph of the urinary system after 5 or 10 minutes.

*Example 3*

5.7 g. of sodium tetraiodoparaphthalate dissolved in 19 c. c. of distilled water, were injected into the marginal vein of the ear of a rabbit weighing 1.47 kgs.

A radiograph taken 15 minutes after, showed the image of the urinary system.

The animal survived quite well, in spite of the injection of a dose of substance corresponding to 3.85 g. per kg.

*Example 4*

A 15% solution of sodium tetraiodoparaphthalate in distilled water, injected by catheterization into the ureters or the renal pelvis, permits of obtaining a pyelograph in the usual manner.

*Example 5*

20 c. c. of a solution of 6 g. of sodium tetraiodoparaphthalate in distilled water, injected by the intravenous method, permit of obtaining a radiograph of the urinary system, after 5 to 10 minutes.

*Example 6*

A solution of 10 g. of triethanolamine tetraiodophthalate, in intravenous injection, permits of obtaining for human beings, a radiograph of the urinary system, after 5 to 10 minutes.

Obviously, the invention is not limited to the specific compounds and the methods of use above mentioned, which are given solely by way of example.

Having now described my invention what I claim as new and desire to secure by Letters Patent is:

1. An X-ray contrast composition containing a water soluble and non-toxic salt of an acid from the group consisting of tetraiodometaphthalic and tetraiodoparaphthalic acids.

2. An X-ray contrast composition containing a water soluble and non-toxic substance of the formula

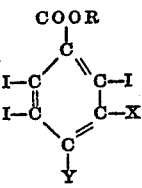

in which R represents a basic radical of the group consisting of alkali metals, alkaline earth metals and amines, one of the symbols X, Y representing iodine and the other a second COOR group.

3. An X-ray contrast composition containing a water soluble and non-toxic salt formed of an acid radical from the group consisting of tetraiodometaphthalic and tetraiodoparaphthalic acid and of a basic radical of the group consisting of alkali metals, alkaline earth metals and amines.

4. An X-ray contrast composition containing a sodium salt of an acid from the group consisting of tetraiodometaphthalic acid and tetraiodoparaphthalic acid.

ANDRÉ GASTON JULES GUERBET.